United States Patent [19]

Halford

[11] Patent Number: 5,347,637
[45] Date of Patent: Sep. 13, 1994

[54] MODULAR INPUT/OUTPUT SYSTEM FOR SUPERCOMPUTERS

[75] Inventor: Robert J. Halford, Chippewa Falls, Wis.

[73] Assignee: Cray Research, Inc., Eagan, Minn.

[21] Appl. No.: 390,722

[22] Filed: Aug. 8, 1989

[51] Int. Cl.⁵ .............................................. G06F 13/00
[52] U.S. Cl. ........................... 395/325; 364/DIG. 1; 364/229; 364/230; 364/231.5; 364/238; 364/238.2; 364/238.3; 364/238.5; 364/238.6; 364/239; 364/239.3; 364/239.5; 364/239.7; 395/250
[58] Field of Search ................ 364/200, 900, DIG. 1, 364/DIG. 2; 395/325, 250, 275, 575

[56] References Cited

U.S. PATENT DOCUMENTS

| 3,836,891 | 9/1974 | McDaniel. | |
|---|---|---|---|
| 3,842,405 | 10/1974 | Key et al. | 395/200 |
| 4,038,642 | 7/1977 | Bouknecht et al. | 395/275 |
| 4,125,870 | 11/1978 | Suzuki et al. | 395/275 |
| 4,258,418 | 3/1981 | Heath | 395/250 |
| 4,309,755 | 1/1982 | Lanty | 395/275 |
| 4,385,382 | 5/1983 | Goss et al. | 395/325 |
| 4,403,282 | 9/1983 | Holberger et al. | 395/325 |
| 4,454,575 | 6/1984 | Bushaw et al. | 395/275 |
| 4,455,661 | 6/1984 | Qureshi | 375/8 |
| 4,458,316 | 7/1984 | Fry et al. | 395/250 |
| 4,543,627 | 9/1985 | Schwab | 395/200 |
| 4,571,674 | 2/1986 | Harting | 395/250 |
| 4,602,331 | 7/1986 | Sheth | 395/250 |
| 4,607,346 | 8/1986 | Hill | 395/425 |
| 4,628,446 | 12/1986 | Hoffner, II | 395/275 |
| 4,807,121 | 2/1989 | Halford | 395/275 |
| 4,819,232 | 4/1989 | Krings | 371/9.1 |
| 4,849,929 | 7/1989 | Timsit | 395/575 |
| 4,852,045 | 7/1989 | Kraul et al. | 395/325 |
| 4,860,193 | 8/1989 | Bentley et al. | 395/250 |
| 4,870,643 | 9/1989 | Bultman et al. | 371/11.1 |
| 4,878,173 | 10/1989 | Goekjian | 395/325 |
| 4,901,230 | 2/1990 | Chen et al. | 395/325 |
| 4,939,644 | 7/1990 | Harrington et al. | 395/275 |
| 5,062,043 | 10/1991 | Asakawa et al. | 395/425 |
| 5,065,314 | 11/1991 | Maskovyak | 395/325 |
| 5,072,420 | 12/1991 | Conley et al. | 395/425 |
| 5,127,088 | 6/1992 | Takaki | 395/275 |

OTHER PUBLICATIONS

IBM Technical Disclosure Bulletin, Chapman et al., Data Management in a Circular Buffer, Jun. 1978, vol. 20, No. 8, pp. 3309–3310.

Primary Examiner—Michael R. Fleming
Assistant Examiner—Ayaz Sheikh
Attorney, Agent, or Firm—Schwegman, Lundberg & Woessner

[57] ABSTRACT

A modular input-output subsystem for a supercomputer is disclosed. Peripheral devices are coupled to the system through channel adaptor interfaces, while communication with the CPU is through high speed data channels. A memory buffer is provided to buffer data transfers between the peripherals and the Central Processing Units (CPUs) and the Solid State Storage Devices (SSDs).

10 Claims, 6 Drawing Sheets

FIG. 3 CPU READ FROM PERIPHERAL

FIG. 4 CPU WRITE TO PERIPHERAL

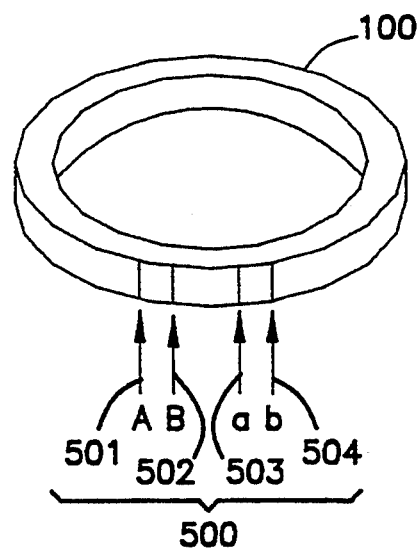
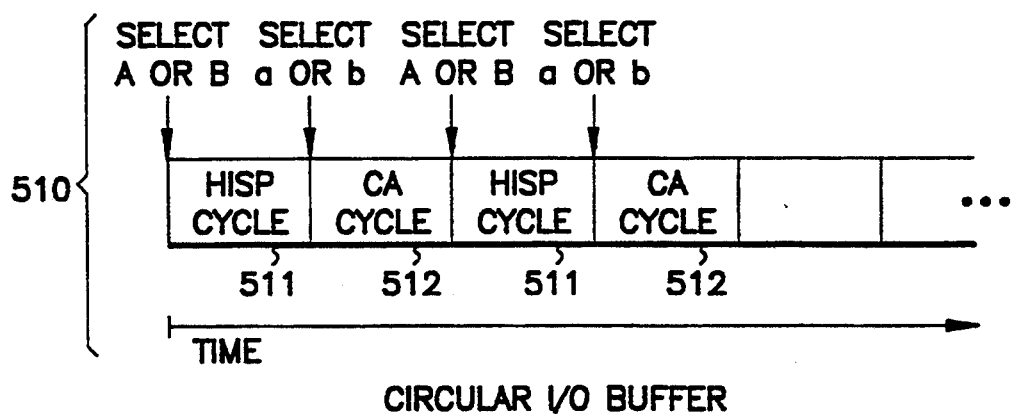
FIG. 5

MODULAR INPUT/OUTPUT SYSTEM FOR SUPERCOMPUTERS

TECHNICAL FIELD OF THE INVENTION

The present invention relates generally to the field of input/output systems used with digital computing systems, and more particularly to a peripheral interface control subsystem used with a supercomputer.

BACKGROUND OF THE INVENTION

Mainframe digital supercomputers are composed of functional subsystems. These subsystems may include one or more central processing units (CPUs); central memory, which is directly addressable by the CPUs; a solid state storage device (SSD) or auxiliary cache, which is accessed through high speed data channels; and input-output subsystems.

The input/output subsystems (IOS) have been traditionally used to transfer data into and out of the supercomputer system. As such, a number of peripheral devices have been coupled to the supercomputer through the IOS subsystem. Two of the most common peripherals include magnetic tape transports and magnetic disk storage units.

In operation the IOS normalizes transactions between commercially available peripheral devices and the CPU. This permits the CPU to communicate in a standard fashion with peripheral devices, with the necessary translation being provided by the IOS subsystem. This translation activity is accomplished in two steps. First, each peripheral device, a disk drive for example, usually has circuitry which converts standard command signals into data storage or retrieval operations. This circuitry is referred to as a disk controller. Second, a channel adapter has electrical circuitry sufficient to translate high level control instructions from the IOS into the basic controller command signals necessary to perform the instruction. This type of IOS has a large buffer memory, one or more input-output processors, and communicates to the other components of the computer system through various channel interfaces.

The inclusion of SSD devices in supercomputing systems as taught by U.S. Pat. No. 4,630,230 to Sundet has placed increased demands on the performance of the IOS subsystem. The distribution of additional fast cache memory throughout the system makes the performance of the system strongly dependant on the IOS data paths and performance.

SUMMARY OF THE INVENTION

In contrast to the architecture of the prior art IOS, the IOS of the present invention includes a circular memory buffer which is coupled to a high speed multiplexor. The multiplexor is coupled to two high speed data channels (HISPs).

In one illustrative configuration, the IOS is connected to both the CPU and the SSD. The connection to the CPU is through one HISP data channel and the connection to the SSD is through the other HISP data channel. In this configuration, the IOS can transfer data to and from the SSD independently of data transfers between the IOS and the CPU.

The illustrative example demonstrates that the IOS can be considered conceptually as a data coupler which can match the bandwidth of the logical devices which it interconnects.

This architecture improves the overall performance of the computing system and is readily scaled to various hardware configurations.

The preferred partitioning of the IOS subsystem divides the system into modules. Each module has one IOP processor to supervise four peripherals. Each peripheral is coupled to one of four channel adaptors. Each channel adaptor is connected to its own circular memory buffer. A single multiplexor structure is provided to couple any of the buffers with either of the high speed data channels.

The multiplexor function and the circular memory buffer function are controlled by the input/output processor (IOP). This processor operates under the control of software which resides in a local memory contained in the module. Two important tasks for the IOP are; monitoring the buffer operation and; defining the data path by controlling the routing function of the multiplexor.

Since the multiplexor operates under the control of a stored program computer the connectivity hierarchy can be adjusted. For example, priority can be given to one channel adaptor which will permit it to preferentially gain access to a high speed data channel or to preferentially retain access to a high speed data channel. This feature of the architecture can be useful when the preferred channel is dedicated to a real time task. In a similar fashion the CPU or SSD can be given priority access to the peripherals. This flexibility permits optimization of the performance of the supercomputer system by permitting the mixing of low and high bandwidth devices without lockouts, overruns or underruns.

BRIEF DESCRIPTION OF THE DRAWINGS

FIG. 5 shows a detailed diagram of the circular IO buffer functions.

DETAILED DESCRIPTION OF THE PREFERRED EMBODIMENTS

In the following detailed description of the preferred embodiment, reference is made to the accompanying drawings which form a part hereof, and in which is shown by way of illustration a specific embodiment in which the invention may be practices. This embodiment is described in sufficient detail to enable those skilled in the art to practice the invention, and it is to be understood that other embodiments may be utilized and that structural changes may be made without departing from the scope of the present invention. The following detailed description is, therefore, not to be taken in a limiting sense, and the scope of the present invention is defined by the appended claims.

GENERAL DESCRIPTION

Figure 1:
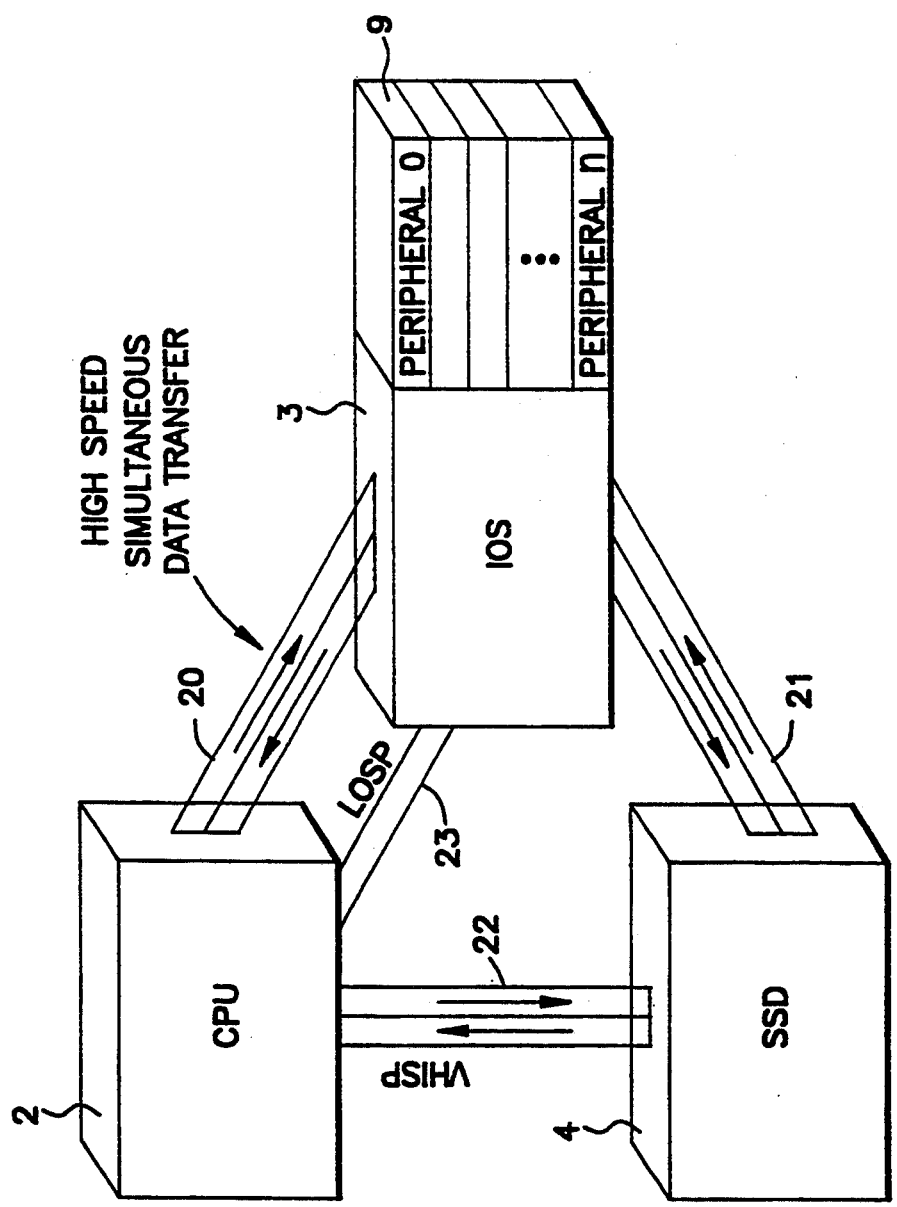
FIG. 1 shows a high level functional block diagram of an illustrative super computer data processing system.

Referring to FIG. 1, there is shown a simplified supercomputing system comprising a CPU subsystem 2. The CPU is connected to the IOS 3 through a high speed bidirectional communication link or HISP 20. The system also includes an SSD 4 of the type disclosed in U.S. Pat. No. 4,630,230 to Sundet which is incorporated by reference herein. The SSD 4 is connected to the IOS 3 through another HISP 21. The CPU 2 and the SSD 4 also have an interconnection through VHISP 22. Command information is delivered to the IOS through low speed communication channel which is shown in the figure as LOSP 23. The IOS itself is connected to a variety of peripheral devices 9. These devices may be magnetic storage units or other peripheral devices.

In operation the IOS accepts "read" or "write" commands issued by the CPU over the low speed communication path 23. The IOS will then retrieve or store identified data from the appropriate peripheral. The identified data is transmitted to or from the requesting device at high speed over the appropriate HISP.

In general the HISP will exhibit a data bandwidth of 100–200 million bytes per second. The LOSP data bandwidth is approximately 6 million bytes per second. Peripherals will exhibit a wide range of data bandwiths from approximately 1 to 100 million bytes per second. This disparity in data bandwith requires that a buffer function be provided in the IOS.

Figure 2:
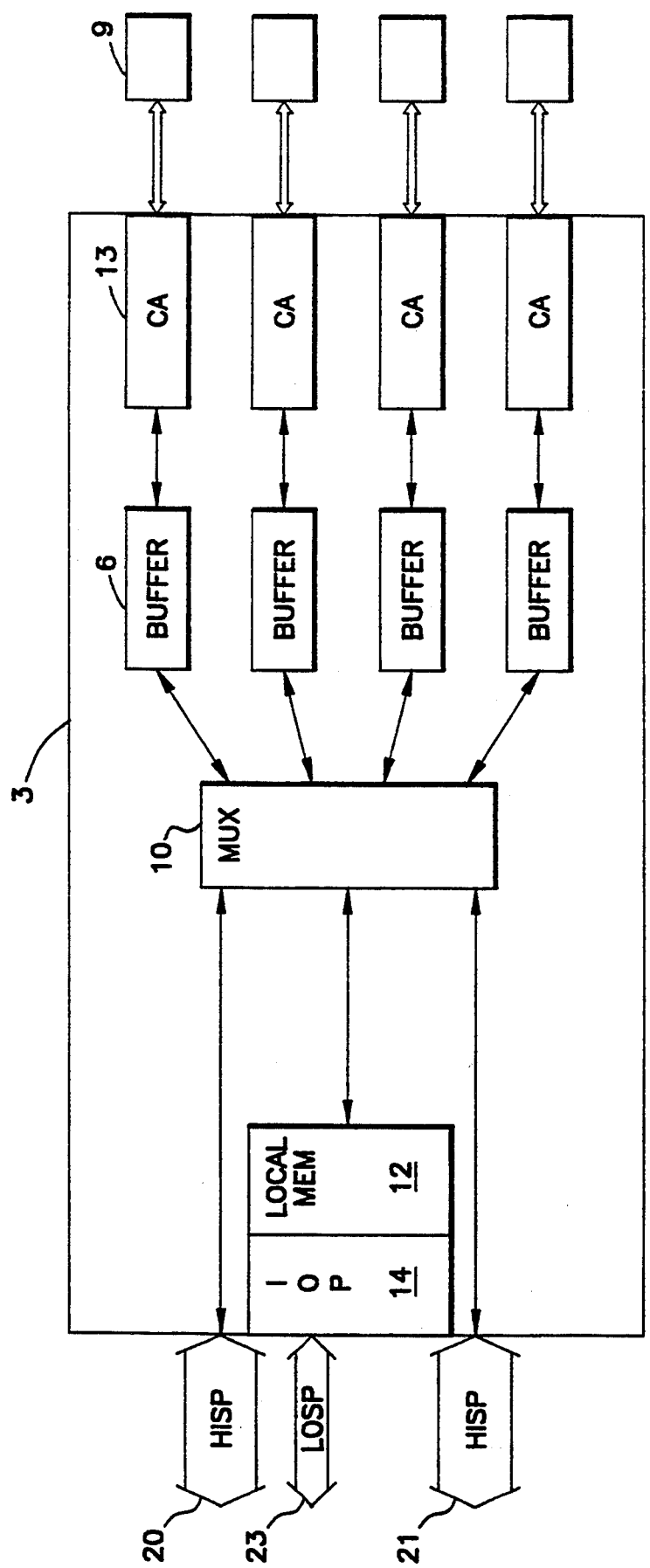
FIG. 2 shows a functional block diagram of the IOS.

Referring to FIG. 2 there is shown a representative single level IOP cluster. Each module 3 is expected to service one CPU in a multiprocessor configuration. Connection to the CPU for data transfer is through the HISP 20. Connection to the CPU for command and status information is through the LOSP 23. The peripheral 9 is cabled to the IOS and connected to a channel adapter 13 (CA). Up to four channel adaptor are available on each IOS module.

A function of the channel adaptor is to perform format conversion on the data between the peripheral format and the circular memory buffer format. Typically data stored on the peripheral will be assembled into 64 bit data words in latches located in the channel adaptor. Once the data word is assembled in the latch, an error recovery byte is added to it forming a 72 bit data word. It is preferred to manipulate data in the IOS with an error recovery byte integrated with the data even though this consumes available data bandwidth.

Each channel adaptor is linked to a circular memory buffer 6. This structure is preferably 65K words long. This memory is connected to the data multiplexor 10. This allows the memory to be shared by the channel adaptor, the IOP processor and either of the HISP channels. Competition for access to the memory buffer is avoided by allowing the channel adapter and the HISP to access the memory on different memory clock cycles.

Access to the memory address space is allocated through the assignment of pointers. The IOP 14 monitors the memory for overflow and underflow conditions and assigns pointers to avoid data underflow and data overflow.

CPU Read from Peripheral

Figure 3:
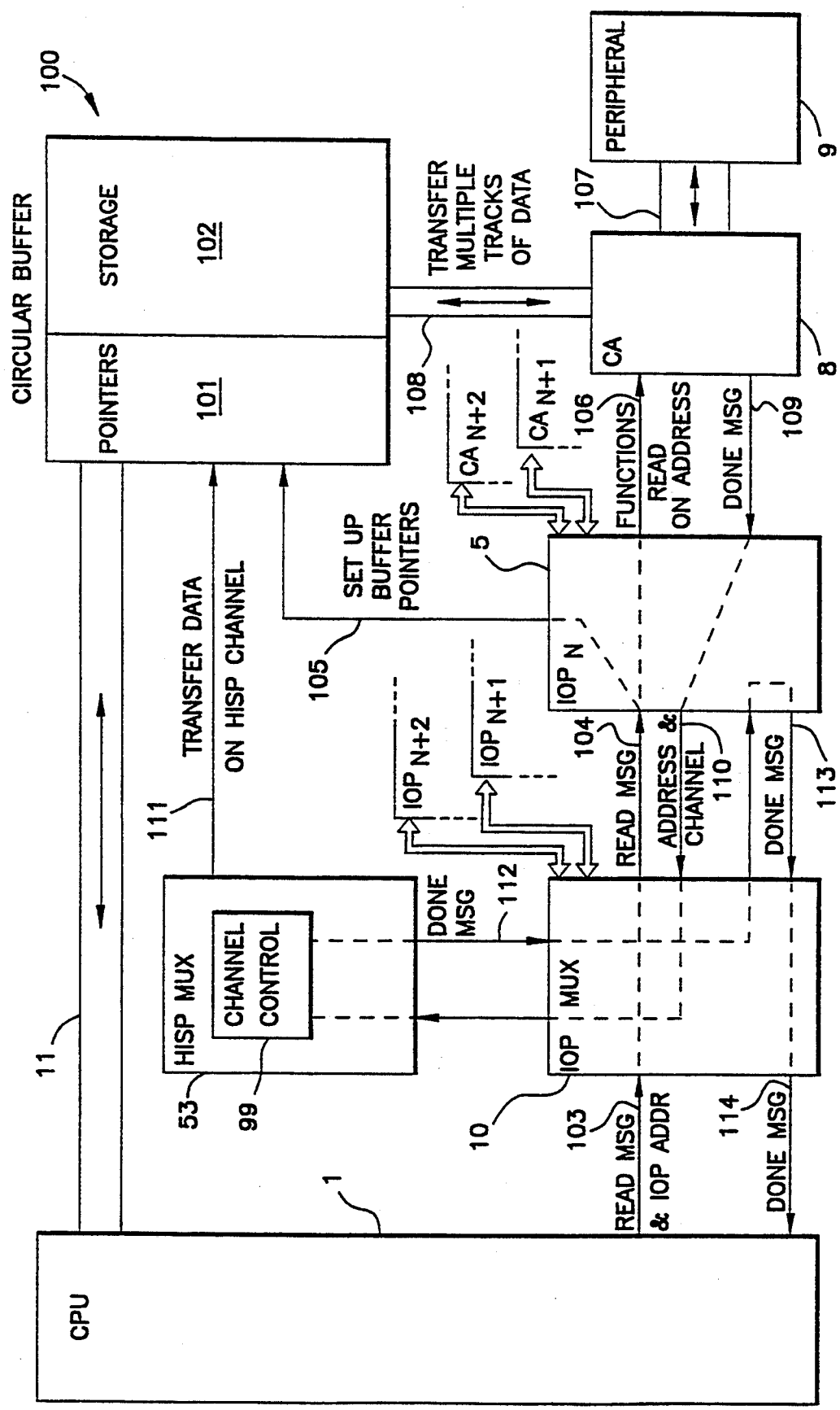
FIG. 3 shows a functional block relationship diagram of the elements of the IOS interacting with a CPU.

Referring now to FIG. 3, there is shown a functional block relationship diagram of the elements of the IOS interacting with a CPU. A CPU read from peripheral is initiated by the CPU 1 by asserting a read message 103 to the IOS. The read message is directed by the IOP multiplexor 10 to the appropriate IOP 5 as a read message 104. The IOP 5 then sets up 105 access pointers and circuitry 101 within the circular buffers 100. Next, the IOP 5 functions 106 the channel adaptor 8 to perform a read on a particular address on the disk 9. Depending on the particular application which is running, the disk data may be requested as sectors, multiple sectors or multiple tracks. Throughout the description an illustrative and non-limiting example of a track request is described.

The channel adaptor 8 performs the read on the peripheral 9 by asserting the necessary command signals through the peripheral interface 107. The data from the read is loaded in multiple tracks 108 into the storage portion 102 of the circular buffer 100 based on pointers 101 within the circular buffer. After the data has been transferred by the channel adaptor 8, it signals 109 the IOP 5 that the read operation has completed.

The IOP 5 interprets the done message from the channel adaptor 8 and responds by signaling 110 through the IOP MUX to the HISP MUX 53. This signal includes an address within main memory to write the data stored in the circular buffer and a channel on which to transmit the data in the circular buffer 100. The HISP MUX 53, through its channel control circuitry 99, initiates and controls a transfer 111 of data within the storage area of the circular buffer 102 through the high speed data channel 111 to its destination address. When the channel control circuitry 99 has completed the transfer, it responds with a done message 112 to the IOP MUX 10.

The IOP MUX transfers the done message to the IOP 5 which responds with an appropriate completion message 113 through the IOP MUX 10 to the CPU 1 with the appropriate low speed (LOSP) completion message 114.

CPU Write to a Peripheral

Figure 4:
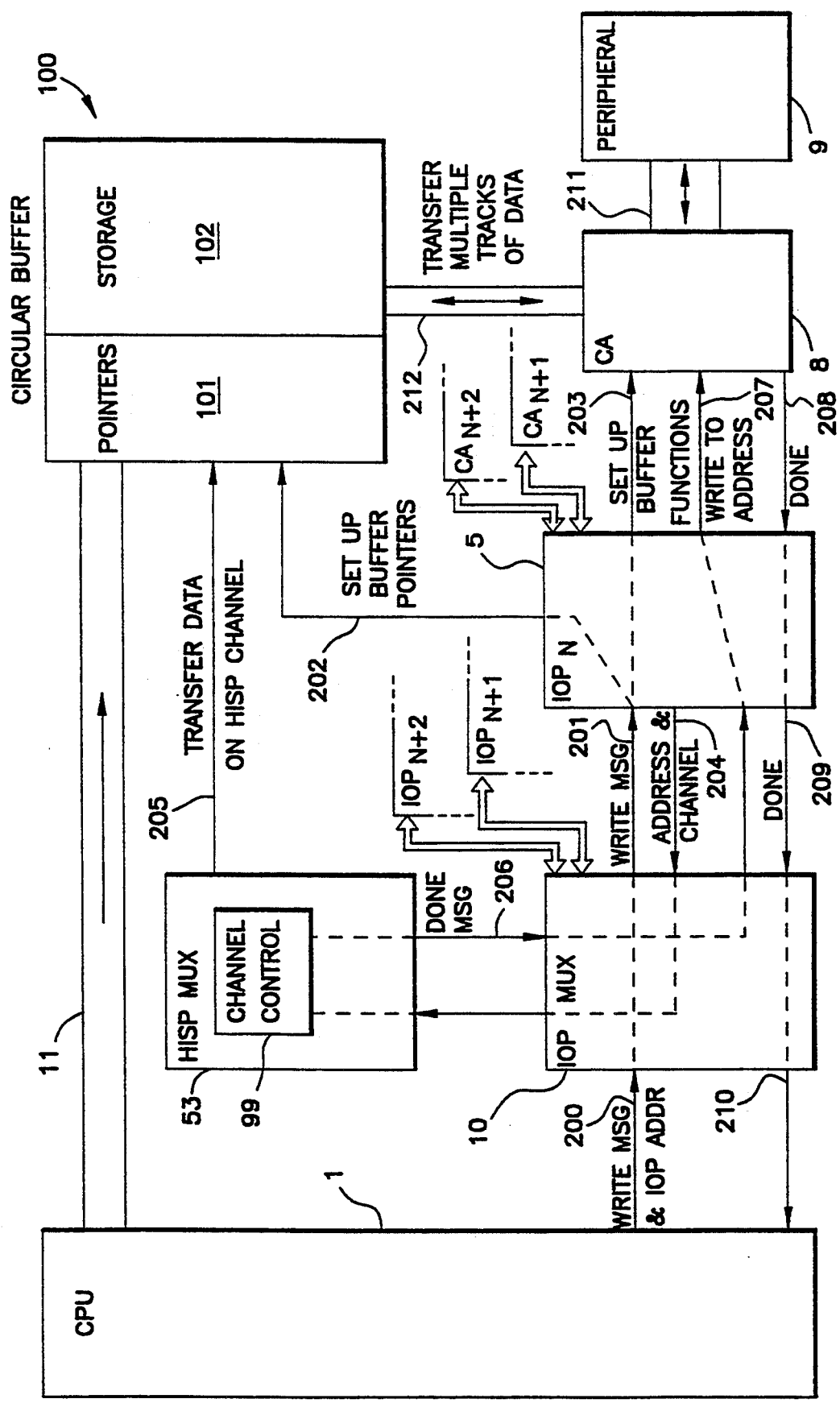
FIG. 4 shows a functional block diagram of relationship between a CPU and elements of the IOS.

Referring now to FIG. 4, there is shown a functional block diagram of relationships between a CPU and elements of the IOS. A CPU 1 initiates a write to a peripheral by asserting a write message to an IOP address 200 through the IOP MUX 10. The IOP MUX 10 transfers the message 201 to the appropriate IOP 5. The IOP 5 sets up 202 buffer pointers 101 and control circuitry within the circular buffer 100 for the write operation.

The IOP then signals the HISP MUX 53 by asserting a message containing an address and a channel 204 through the IOP MUX 10. The message is routed to the channel control circuitry 99 within HISP MUX 53. The channel control circuitry 99 then initiates and controls 205 a data transfer through the HISP channel 11 from the CPU into the circular buffer from the CPU 1 through the HISP channel 11 to the circular buffer 100. It accesses control circuitry and pointers 101 to address storage 102 within the circular buffer.

When the channel control circuitry 99 completes the transfer, it responds with a done message 206 to the IOP MUX through the IOP MUX 10 to the IOP 5.

The IOP 5, upon receiving a transfer completion message 206 from the HISP MUX 53 functions a write signal 207 to the channel adaptor 8. The channel adaptor 8 then transfers tracks of data previously set up 203 in the circular buffer storage area 102. It transfers them 211 to its attached peripheral 9. When the channel adaptor 8 completes the transfer, it responds with a done message 208 to the attached IOP 5. The IOP transfers the done message 209 through the IOP MUX 10 onto the LOSP channel 210 as a write completion message 210.

I/O Buffer

Referring now to FIG. 5, there is shown a detailed diagram of the circular IO buffer functions. Each buffer 100 is comprised of random access memory devices arranged in an orthogonally addressed array of 65,536 72-bit words. Four registers 501, 502, 503, and 504 hold addresses within the buffer address space. The IOP sets the values in these registers as discussed above. The buffer address is used to form a circular data structure.

The lower portion 510 of FIG. 5 shows the relationship of buffer access through the address pointers. As time progresses, alternate cycles of HISP 511 and CA 512 access are performed. Reads and writes are performed on the buffer by accessing the orthogonal array through addresses contained either in the "A" or "B" registers on the one hand or the "a" or "b" registers on the other.

Referring now to FIG. 5, there is shown a detailed diagram of the functional elements of a circular IO buffer in this relationship to other elements of the system. The HISP MUX controller 99 controls the function of the pointers during data transfer on the HISP channel. The circular buffer address space 102 is pointed to by a dual level addressing MUX within the pointers 101 area the circular IO buffer 100. Addresses are stored in the control registers "a" 503, "b" 504, "A" 501, "B" 502 during transfer set-up performed by the IOP discussed above. Based on HISP control signals from the HISP MUX controller 99, the pointers 101 control circuitry clocks an address onto the address bus 600. The data bus is latched into a data latch 602 which is clocked onto the HISP channel 11, or in the channel adaptor 8. All clocking is governed by a single clock source 45 within the IOS.

Figure 6:
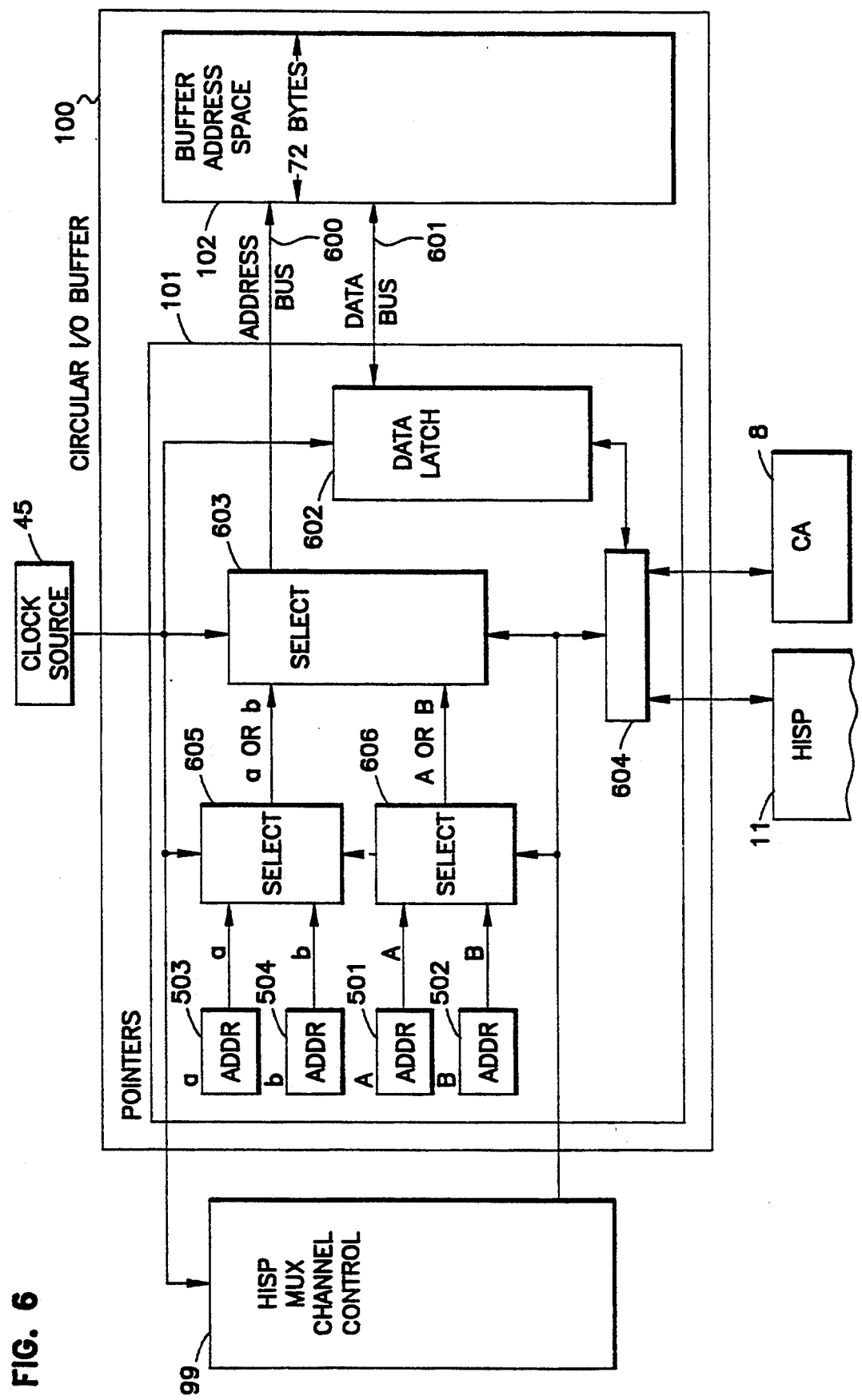
FIG. 6 shows a detailed diagram of the functional elements of a circular IO buffer and its relationship to other elements of the system.

As shown in FIGS. 5 and 6, the address which is clocked onto the address bus 600 is determined through a buffer cycle selector 604. The buffer cycle selector loads the "A" 501 or "B" 502 register contents onto the address bus if the HISP 11 is accessing the buffer. If the pointer circuitry is in a CA cycle, the address is taken from select circuitry 605 which determines an address out of the "a" 503, or "b" 504 registers. Depending on which buffer cycle is active the buffer may be coupled to either the HISP or the channel adaptor.

This architecture permits reads, from a disk, for example, wherein the "a" register is loaded with a beginning address for track 0, and the "b" register is loaded with an address for data from track 1. The IOP functions the channel adaptor to read tracks 0 and 1 from the disk into the buffer at the respective addresses. The IOP can then set "A" and "B" equal to "a" and "b". It then functions the HISP MUX controller 99 to transfer data onto the HISP channel from locations "A" and "B" while initiating a simultaneous read or write from the disk through the channel adaptor. It is this circular IO buffering architecture which permits multiple simultaneous reads and writes to and from the IOS.

While the present invention has been described in connection with the preferred embodiment thereof, it should be understood that many modifications will be readily apparent to those of ordinary skill in the art, and this application is intended to cover any adaptations or variations thereof. Therefore, it is manifestly intended that the invention is limited only by the claims and equivalents thereof.

I claim:

1. An input/output module for an input/output system for sue in interfacing between a high speed vector processing supercomputer and a plurality of peripheral devices, comprising:
   a) channel adapter means including a plurality of channel adapters each connected for interfacing with one of the plurality of peripheral devices wherein each of the peripheral devices has a peripheral data format, and each of said channel adapters of said channel adapter means further adapted for performing format conversion on data between said peripheral data format and a format required by the input/output system;
   b) high speed data channel means for bidirectional coupling with the supercomputer and for transmitting and receiving data;
   c) memory buffer means including a plurality of memory buffers each connected for storing data and each of said plurality of memory buffers being coupled in a dedicated connection to one of said channel adapters;
   d) multiplexer means coupled between said high speed data channel means and said plurality of memory buffers of said memory buffer means for transferring data to said high speed data channel means;
   e) I/O processor means connected to said high speed data channel means, said memory buffers means and said channel adaptor means for controlling data transfers between said high speed data channel means and said memory buffer means and further connected for controlling data transfers between said channel adapter means and said memory buffer means by permitting said channel adapter means and said high speed data channel means access to said memory buffer means on alternate memory access cycles; and
   f) said I/O processor means further connected for allowing each of said channel adapters to access one of the plurality of peripheral devices to which it is attached simultaneous with the accessing of the memory buffers by the high speed channel.

2. The input/output module according to claim 1 wherein each of said memory buffers of said memory buffer means further includes first pointer means having address pointers for indicating addresses where data received from each of said channel adapters of said channel adapter means is stored and second pointer means having address pointers for indicating addresses where data to be transferred to said high speed data channel means is stored.

3. The input/output module according to claim 2 wherein each of said memory buffers of said memory buffer means further includes means for preventing said first and second pointer means from overwriting data in each of said memory buffers of said memory buffer means.

4. The input/output module according to claim 1 wherein each memory buffer of said memory buffer means comprises a circular memory buffer.

5. The input/output module according to claim 1 further including:
   said I/O processor means further coupled to said multiplexer means for directing data from a plurality of said memory buffers onto said high speed data channel means; and low speed channel means coupled between the supercomputer and said control means for receiving control information from the supercomputer.

6. A modular input/output system for use in a supercomputer, comprising:

a high speed bidirectional data channel connected to a central processing unit of the supercomputer;

low speed channel means connected to a central processing unit of the supercomputer for delivering command information;

an input/output module connected to said high speed bidirectional data channel, said low speed channel means and a plurality of peripheral devices, including:

a plurality of memory buffers;

a plurality of channel adapters, each coupled in a dedicated fashion between one of said plurality of memory buffers and at least one of said plurality of peripheral devices;

data multiplexer means coupled between said high speed bidirectional data channel and said plurality of memory buffers for directing data flow between said high speed bidirectional data channel and a selected one of said plurality of memory buffers;

a plurality of input/output processors, each coupled to receive commands from said low speed channel means and each coupled to control some of said plurality of channel adapters such that each channel adapter is controlled by one input/output processor;

said input/output processors further coupled to control said data multiplexer means and said plurality of memory buffers;

each of said memory buffers further including means for allowing said channel adapters and said data multiplexer means to access memory locations within each of said memory buffers on alternate memory access cycles such that competition for access to the memory buffer is avoided.

7. The modular input/output system of claim 6 further including a second high speed bidirectional data channel connected between said data multiplexer means and a Solid State Storage Device (SSD) such that said input/output module can transfer data to and from said SSD independently of data transfers to and from said central processing unit.

8. The modular input/output system of claim 6, wherein said input/output processors assign address pointers into said memory buffer such that said pointers are assigned to avoid data underflow and data overflow.

9. The modular input/output system of claim 8, wherein said pointers further comprise a first set of pointers used to control transfer of data between said one of said plurality of memory buffers of said input/output module and said central processing unit over said high speed data channel and a second set of pointers used to control transfer of data between said selected one of said plurality of memory buffers of said input/output module and one of said channel adapters.

10. The modular input/output system of claim 9, further including clock source means for alternately selecting between said pointers such that access to said memory buffers by said high speed data channel and said channel adapters occurs on different memory clock cycles.

* * * * *

UNITED STATES PATENT AND TRADEMARK OFFICE
CERTIFICATE OF CORRECTION

PATENT NO. : 5,347,637  
DATED : September 13, 1994  
INVENTOR(S) : Robert J. Halford, et al.

Page 1 of 3

It is certified that error appears in the above-indentified patent and that said Letters Patent is hereby corrected as shown below:

On the title page, items insert --U.S. PATENTS DOCUMENTS at [56]

| | | |
|---|---|---|
| --3,688,274 | 8/1972 | Cormier et al. |
| 3,725,864 | 4/1973 | Clark et al. |
| 3,976,977 | 8/1976 | Porter et al. |
| 4,000,487 | 12/1976 | Patterson et al. |
| 4,006,466 | 2/1977 | Patterson et al. |
| 4,074,352 | 2/1978 | Cook et al. |
| 4,106,092 | 8/1978 | Millers, II et al. |
| 4,162,520 | 7/1979 | Cook et al. |
| 4,228,496 | 10/1980 | Katzman et al. |
| 4,276,594 | 6/1981 | Morley |
| 4,313,160 | 1/1982 | Kaufman et al. |
| 4,378,588 | 3/1983 | Katzman et al. |
| 4,484,275 | 11/1984 | Katzman et al. |
| 4,542,457 | 8/1985 | Mortenson et al. |
| 4,788,638 | 11/1988 | Ogawa et al. |
| 4,821,170 | 4/1989 | Bernick et al. -- | insert -- FOREIGN DOCUMENTS after U.S. PATENT DOCUMENTS:

--FOREIGN DOCUMENTS

| | | |
|---|---|---|
| 1,191,560 | 5/1970 | United Kingdom-- |

UNITED STATES PATENT AND TRADEMARK OFFICE
CERTIFICATE OF CORRECTION

PATENT NO. : 5,347,637  
DATED : September 13, 1994  
INVENTOR(S) : Robert J. Halford, et al.

Page 2 of 3

It is certified that error appears in the above-indentified patent and that said Letters Patent is hereby corrected as shown below:

On title page, insert -- OTHER PUBLICATIONS:

--Intelligent Peripheral Interface," Logical Level 3 for Intelligent I/O, Preliminary ANSI Working Document X3T9.3/83-4, Rev.2.0, Dec. 23, 1983.

IBM Disclosure Bulletin, Vol. 32, No. 5A, Oct.89.

"I/O Features of Model 520 Basic," by G.D. Fritz and M.L. Kolesar appearing in Hewlett-Packard Journal, Vol. 33, No. 5, May 1984.

"The Distribution of Power" by Carlos Marino appearing in Computer in Mechanical Engineering, Vol.4, No. 5, March 1986.

Patent Abstracts of Japan, Vol. 12, No. 175, May 25, 1988.--

UNITED STATES PATENT AND TRADEMARK OFFICE
CERTIFICATE OF CORRECTION

PATENT NO. : 5,347,637
DATED : September 13, 1994
INVENTOR(S) : Robert J. Halford, et al.

It is certified that error appears in the above-indentified patent and that said Letters Patent is hereby corrected as shown below:

Column 2, line 55, please delete "practices" and insert --practiced-- therefor.

Column 3, line 7, please insert --a-- after the word "through."

Column 3, line 32, please delete "adapter" and insert --adaptor-- therefor.

Column 3, line 32, please delete "adaptor" and insert --adaptors-- therefor.

Column 6, line 2, please delete "sue" and insert --use-- therefor.

On title page, insert item: [75] --Calvin P. Coleman, Cottage Grove, Minn., George M. Hopkins, Chippewa Falls, Wis., Peter G. Logghe, Chippewa Falls, Wis., Eric P. Lundberg, Eau Claire, Wis., Gerald A. Schwoerer, Chippewa Falls, Wis.--

Signed and Sealed this

Twenty-seventh Day of June, 1995

Attest:

BRUCE LEHMAN

*Attesting Officer*  *Commissioner of Patents and Trademarks*